(12) United States Patent
Lin et al.

(10) Patent No.: US 11,537,228 B2
(45) Date of Patent: *Dec. 27, 2022

(54) TOUCH DISPLAY DEVICE COMPRISING TOUCH DEVICE HAVING TOUCH ELECTRODE AREA AND DUMMY ELECTRODE AREA

(71) Applicant: Au Optronics Corporation, Hsinchu (TW)

(72) Inventors: Tai-Hsuan Lin, Hsinchu (TW); Yu-Feng Chien, Hsinchu (TW); Wen-Rei Guo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,761

(22) Filed: Dec. 16, 2021

(65) Prior Publication Data

US 2022/0107701 A1 Apr. 7, 2022

Related U.S. Application Data

(63) Continuation of application No. 16/865,427, filed on May 4, 2020, now Pat. No. 11,237,658.

(30) Foreign Application Priority Data

Jul. 31, 2019 (TW) ................................ 108127172

(51) Int. Cl.
*G06F 3/044* (2006.01)
*G06F 3/041* (2006.01)
*G09G 3/36* (2006.01)

(52) U.S. Cl.
CPC .......... *G06F 3/0412* (2013.01); *G06F 3/0445* (2019.05); *G06F 3/0446* (2019.05);
(Continued)

(58) Field of Classification Search
CPC .... G06F 3/0412; G06F 3/0445; G06F 3/0446; G06F 3/0448; G06F 2203/04103;
(Continued)

(56) References Cited

U.S. PATENT DOCUMENTS 11,237,658 B2 * 2/2022 Lin ....................... G06F 3/0446

* cited by examiner

*Primary Examiner* — Rodney Amadiz
(74) *Attorney, Agent, or Firm* — JCIPRNET

(57) ABSTRACT

A touch display device including a display panel and a touch device is provided. The display panel includes a plurality of sub-pixels. Each of the sub-pixels includes a pixel electrode and a switching element. The touch device is located on the display panel and includes a touch electrode area and a dummy electrode area. The touch device includes an electrode structure and a conductive mesh. The conductive mesh includes a plurality of reticulated repeating units. Each of the reticulated repeating units is overlapped with at least one corresponding sub-pixel and includes first and second X-shaped conductive structures. Two ends of the first X-shaped conductive structure are connected to two ends of the second X-shaped conductive structure. The first and second X-shaped conductive structures in the touch electrode area are in a continuous pattern. The first and second X-shaped conductive structures in the dummy electrode area are in a discontinuous pattern.

25 Claims, 19 Drawing Sheets

(52) U.S. Cl.
CPC .......... *G06F 3/0448* (2019.05); *G09G 3/364*
(2013.01); *G09G 2300/0413* (2013.01)

(58) Field of Classification Search
CPC .................. G06F 3/0416; G06F 3/044; G06F
2203/04111; G09G 3/364; G09G
2300/0413; G09G 2300/0426; G09G 3/36
See application file for complete search history.

TOUCH DISPLAY DEVICE COMPRISING TOUCH DEVICE HAVING TOUCH ELECTRODE AREA AND DUMMY ELECTRODE AREA

CROSS-REFERENCE TO RELATED APPLICATION

This application is a continuation application of and claims the priority benefit of U.S. application Ser. No. 16/865,427, filed on May 4, 2020, now allowed, which claims the priority benefit of Taiwan application serial No. 108127172, filed on Jul. 31, 2019. The entirety of each of the above-mentioned patent applications is hereby incorporated by reference herein and made a part of this specification.

BACKGROUND OF THE INVENTION

Field of the Invention

The invention relates to a touch display device, and more particularly to a touch display device including a touch electrode area and a dummy electrode area.

Description of Related Art

With the advancement of technology, more and more touch devices have emerged in the market, and various related techniques have continuously been developed. In some personal electrical appliances (such as mobile phones, tablet computers, smart watches, etc.), the touch electrodes are combined with a display panel to form a touch display device having both a touch function and a display function.

In order to perform detailed work (such as drawing or writing) by using the touch function of the touch display device, an active stylus is often used as an auxiliary tool for the work. The active stylus has better pen touch sensing function, and when used with the touch display device, the depth of the pen touch may be sensed. For example, with the aid of an active stylus, when the user writes with greater force, the touch display device may display a thicker handwriting, and when the user writes with less force, the touch control display device may display a thinner handwriting. In order to make the touch display device work better with the active stylus, how to improve the performance of the touch display device is currently an issue to be solved.

SUMMARY OF THE INVENTION

The invention provides a touch display device, wherein a touch device thereof has the advantage of low resistance, and thus the touch display device has better performance.

An embodiment of the invention provides a touch display device including a display panel and a touch device. The display panel includes a plurality of sub-pixels. Each of the sub-pixels includes a pixel electrode and a switching element electrically connected to the pixel electrode. The touch device is located on the display panel and has a touch electrode area and a dummy electrode area. The touch device includes an electrode structure and a conductive mesh. The conductive mesh includes a plurality of reticulated repeating units located in the touch electrode area and the dummy electrode area. Each of the reticulated repeating units is overlapped with at least one corresponding sub-pixel and includes a first X-shaped conductive structure and a second X-shaped conductive structure. Two ends of the first X-shaped conductive structure are connected to two ends of the second X-shaped conductive structure. The first X-shaped conductive structure and the second X-shaped conductive structure in the touch electrode area are in a continuous pattern. The first X-shaped conductive structure and the second X-shaped conductive structure in the dummy electrode area are in a discontinuous pattern.

Based on the above, since the first X-shaped conductive structure and the second X-shaped conductive structure in the touch electrode area are in a continuous pattern, and the first X-shaped conductive structure and/or the second X-shaped conductive structure in the dummy electrode area are in a discontinuous pattern, in addition to reducing the resistance of the touch device, the difference in reflectance between the touch electrode area and the dummy electrode area may also be reduced, thereby improving the performance of the touch display device.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A to FIG. 9A are top views of a manufacturing method of a touch device according to an embodiment of the invention.

FIG. 6B to FIG. 9B are cross-sectional views of section line aa' of FIG. 6A to FIG. 9A, respectively.

DESCRIPTION OF THE EMBODIMENTS

Figure 1A:
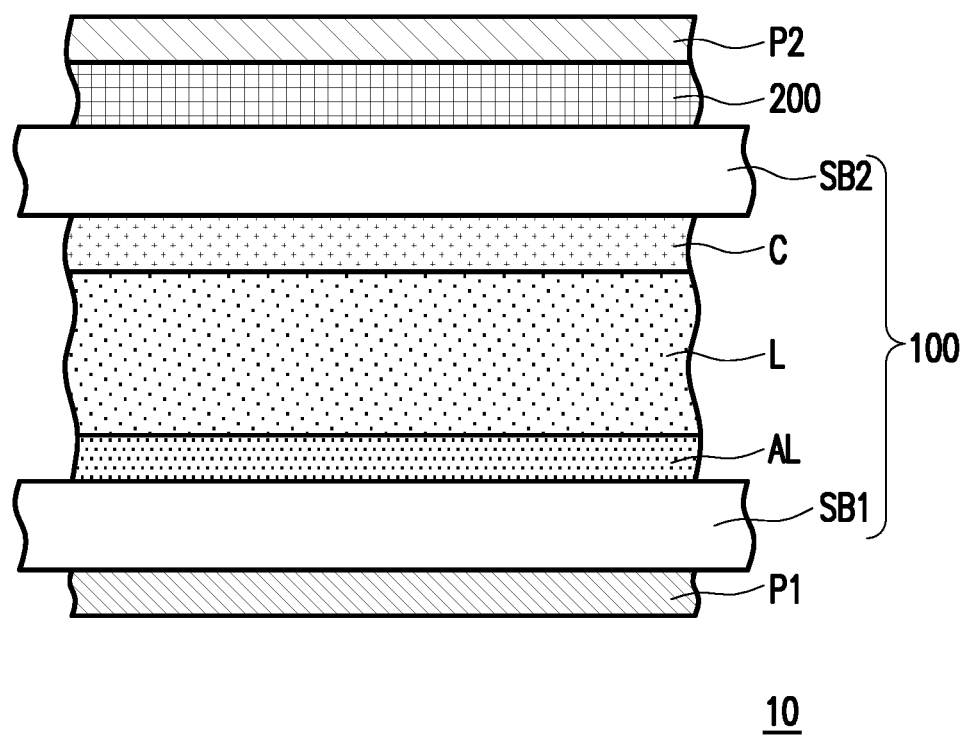
FIG. 1A is a cross-sectional view of a touch display device according to an embodiment of the invention.
Figure 1B:
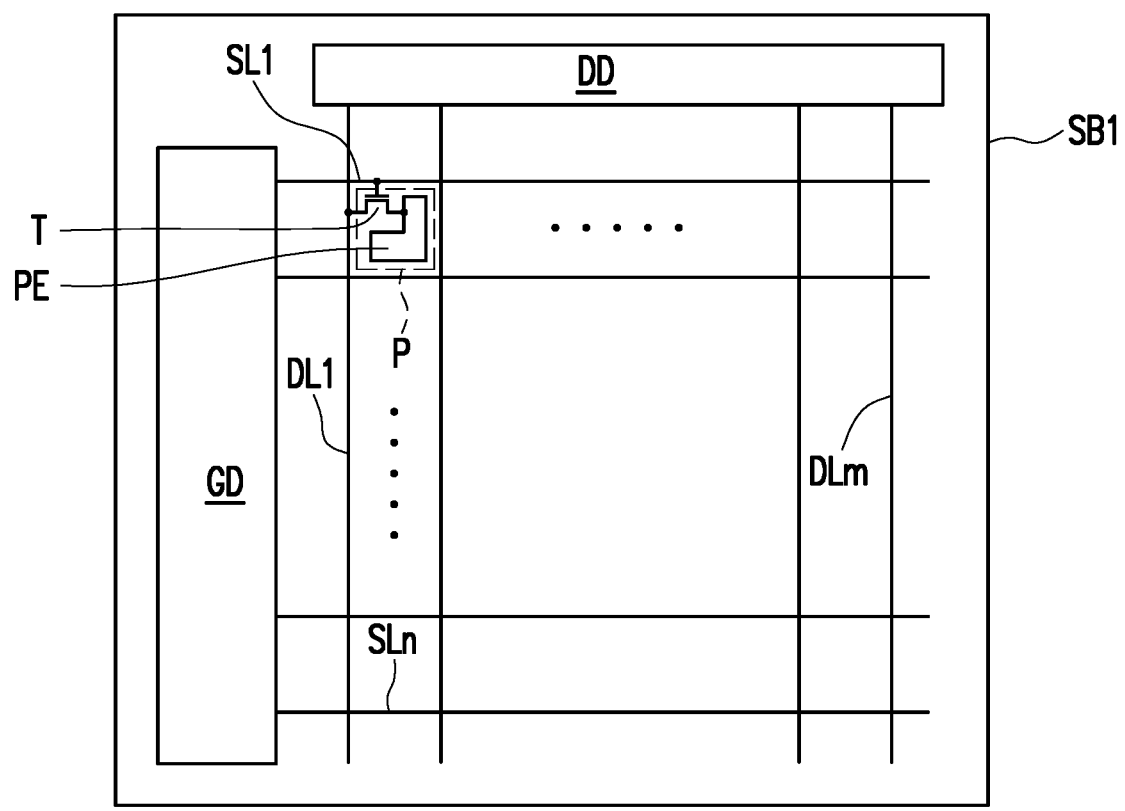
FIG. 1B is a top view of a display panel according to an embodiment of the invention.

FIG. 1A is a cross-sectional view of a touch display device according to an embodiment of the invention. FIG. 1B is a top view of a display panel according to an embodiment of the invention. In particular, FIG. 1B omits some components in the display panel.

A touch display device 10 includes a display panel 100 and a touch device 200. In the present embodiment, the touch display device 10 further includes a polarizer P1 and a polarizer P2.

The display panel 100 includes a plurality of sub-pixels P. In the present embodiment, the display panel 100 includes a first substrate SB1, a second substrate SB2, a display medium layer L, a color conversion element C, and an active element layer AL. The display medium layer L, the color conversion element C, and the active element layer AL are located between the first substrate SB1 and the second substrate SB2.

The active element layer AL is located on the first substrate SB1 and includes a plurality of scan lines SL1 to SLn, a plurality of data lines DL1 to DLm, and a plurality of sub-pixels P. The scan lines SL1 to SLn and the data lines DL1 to DLm are intersected with each other. The sub-pixels P include an active element T and a pixel electrode PE. The active element T may be a bottom gate thin film transistor or a top gate thin film transistor including a gate, a channel, a source, and a drain. The active element T is electrically connected to a corresponding scan line SL1 to SLn and a corresponding data line DL1 to DLm. In addition, the active element T is electrically connected to the pixel electrode PE.

In the present embodiment, the first substrate SB1 further has a driving circuit GD and a driving circuit DD thereon. The driving circuit GD is electrically connected to the scan lines SL1 to SLn. The driving circuit DD is electrically connected to the data lines DL1 to DLm.

The display medium layer L is located between the first substrate SB1 and the second substrate SB2. The display medium layer L is, for example, a liquid crystal or other display media.

The color conversion element C is located on the second substrate SB2. The color conversion element C includes, for example, a red filter pattern, a green filter pattern, and a blue filter pattern. In some embodiments, the color conversion element C may also include filter patterns of other colors. In some embodiments, a black matrix (shown in FIG. 2B) is located between filter patterns of different colors. Although the color conversion element C is located on the second substrate SB2 as an example in the present embodiment, the invention is not limited thereto. In other embodiments, the color conversion element C is located on the first substrate SB1 and forms a color filter on array (COA) structure. In the present embodiment, the black matrix is used to define the area of the sub-pixels P. For example, the black matrix includes a plurality of openings, and each opening corresponds to one sub-pixel P.

The polarizer P1 and the polarizer P2 are respectively disposed on the first substrate SB1 and the second substrate SB2.

The touch device 200 is located on the display panel 100. In the present embodiment, the touch device 200 is disposed between the polarizer P2 and the second substrate SB2, but the invention is not limited thereto. In some embodiments, the polarizer P1 and the polarizer P2 are disposed between the first substrate SB1 and the second substrate SB2.

In the present embodiment, the display panel 100 includes a liquid crystal display panel (such as a TN display panel, an MVA display panel, an AHVA display panel, etc.), but the invention is not limited thereto. In other embodiments, the display panel 100 may be a mini light-emitting diode display panel, an organic light-emitting diode display panel, or other types of display panels.

Figure 2A:
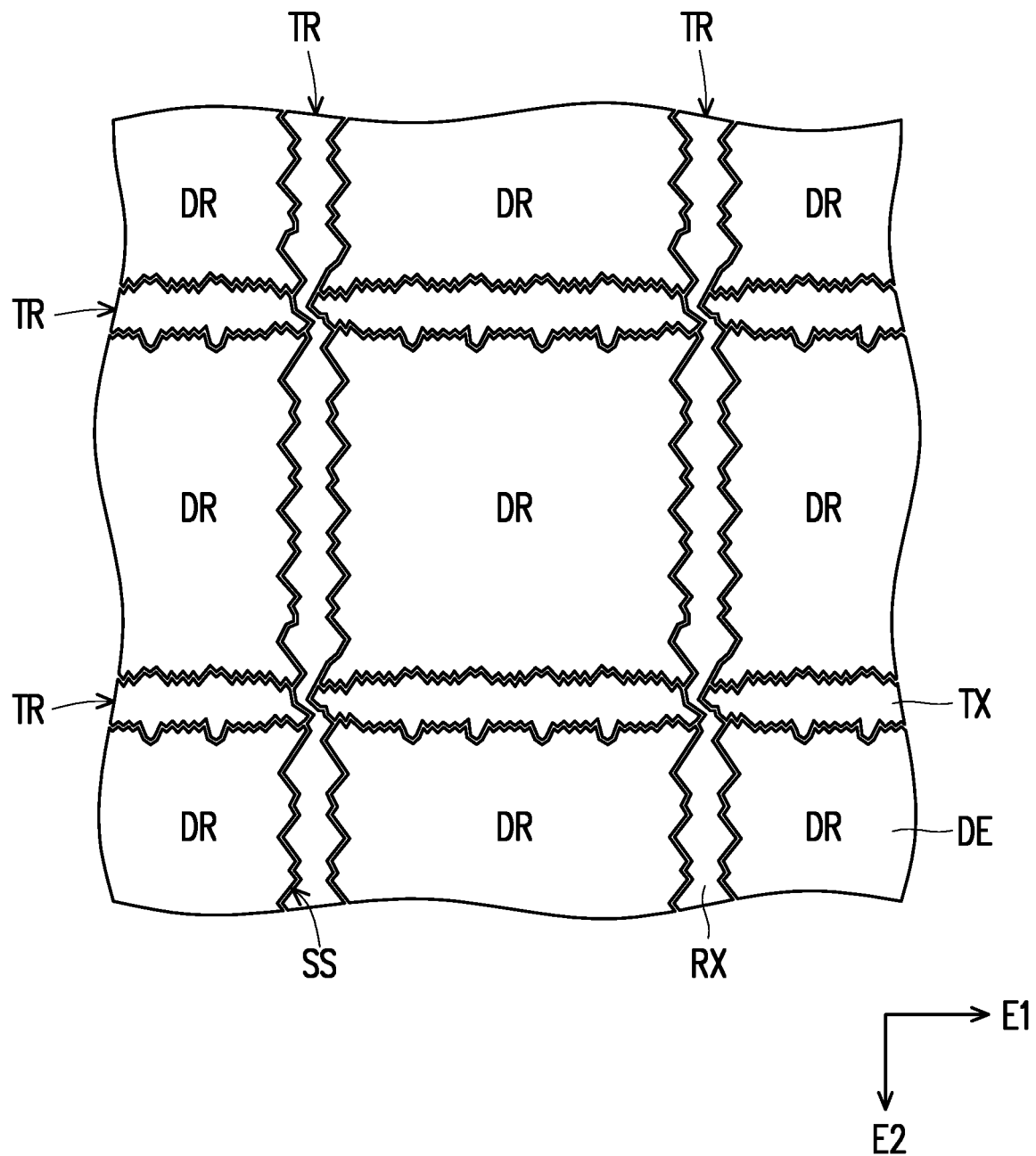
FIG. 2A is a top view of a touch display device according to an embodiment of the invention.
Figure 2B:
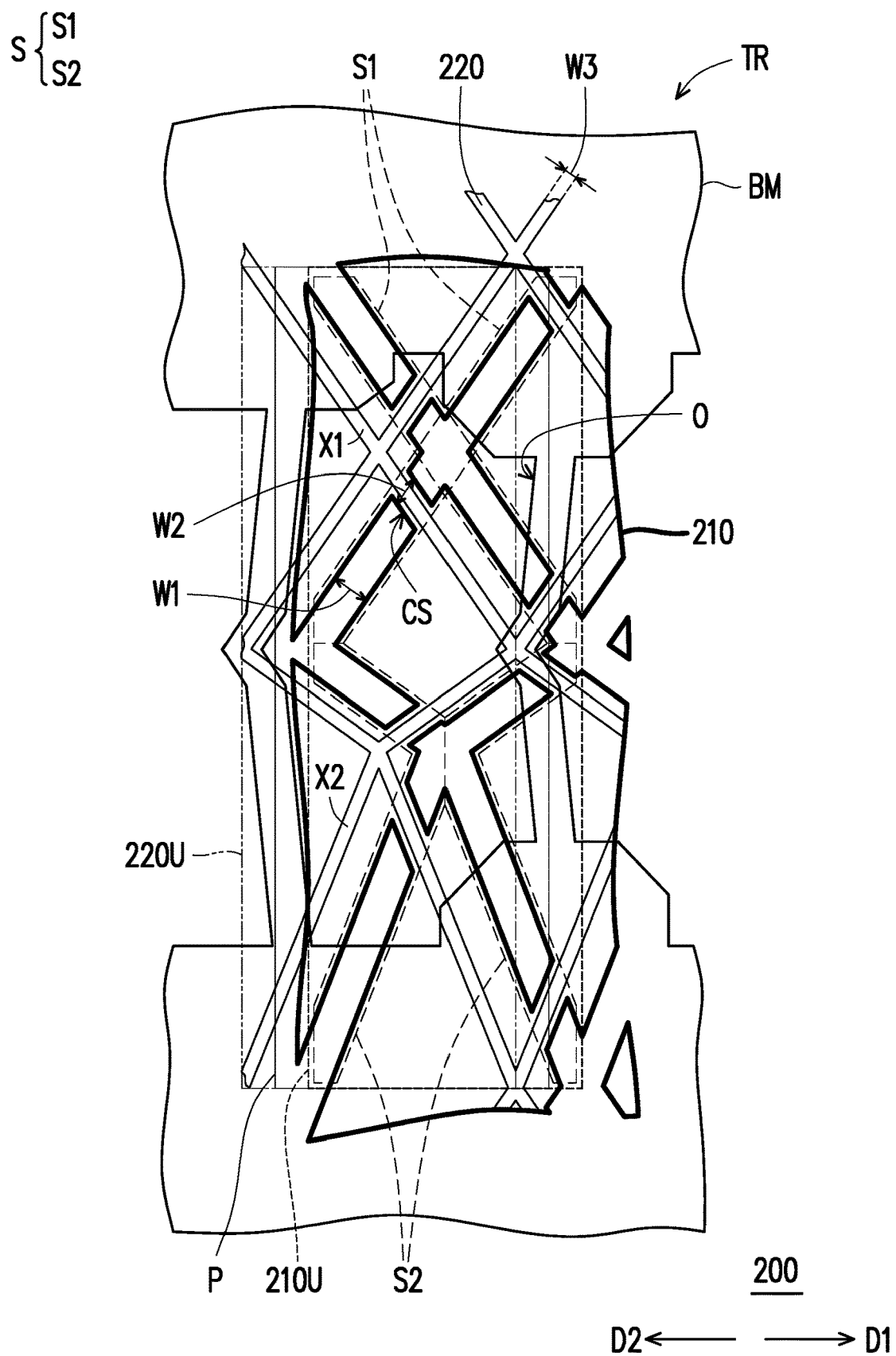
FIG. 2B is a top view of a touch electrode area of a touch display device according to an embodiment of the invention.
Figure 2C:
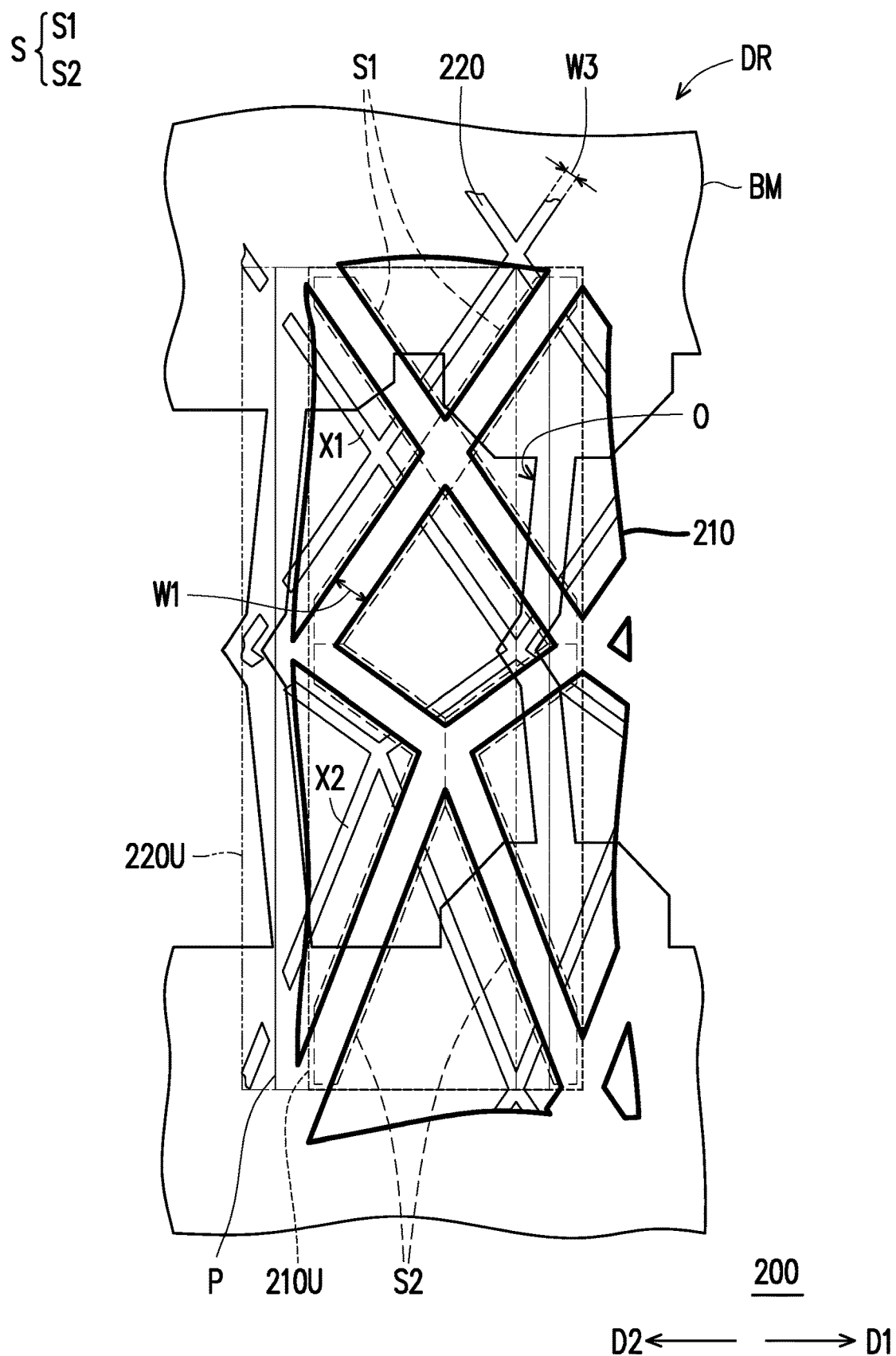
FIG. 2C is a top view of a dummy electrode area of a touch display device according to an embodiment of the invention.

FIG. 2A is a top view of a touch display device according to an embodiment of the invention. FIG. 2B is a top view of a touch electrode area of a touch display device according to an embodiment of the invention. FIG. 2C is a top view of a dummy electrode area of a touch display device according to an embodiment of the invention. For ease of explanation, FIG. 2A shows an electrode structure and omits other components. FIG. 2B shows an electrode structure, a conductive mesh, and a black matrix corresponding to one sub-pixel in the touch electrode area and omits other components. FIG. 2C shows an electrode structure, a conductive mesh, and a black matrix corresponding to one sub-pixel in the dummy electrode area and omits other components.

Referring first to FIG. 2A, FIG. 2B, and FIG. 2C, the touch device 200 has a dummy electrode area DR and a touch electrode area TR. The touch device 200 includes an electrode structure 210 and a conductive mesh 220.

The electrode structure 210 in the touch electrode area TR and the conductive mesh 220 in the touch electrode area TR form a driving electrode TX and a sensing electrode RX. The driving electrode TX may extend along the first direction E1, the sensing electrode RX may extend along the second direction E2, and the first direction E1 intersected with a second direction E2, for example. The driving electrode TX is separated from the sensing electrode RX. The driving electrode TX and sensing electrode RX may be formed by other geometric shapes. In this embodiment, the driving electrode TX is extending along the first direction E1 and the sensing electrode RX is extending along the second direction E2. However, the invention is not limited thereto. In other embodiment, the driving electrode TX may extend along the second direction E2, and the sensing electrode RX may extend along the first direction E1.

The electrode structure 210 in the dummy electrode area DR and the conductive mesh 220 in the dummy electrode area DR form a dummy electrode DE, and the dummy electrode DE is separated from the driving electrode TX and the sensing electrode RX. In the present embodiment, the dummy electrode DE is a floating electrode.

The electrode structure 210 includes a plurality of repeating electrode units 210U and a plurality of connecting structures CS. The repeating electrode units 210U are located in the dummy electrode area DR and the touch electrode area TR. In other words, the dummy electrode DE, the driving electrode TX, and the sensing electrode RX all include a plurality of repeating electrode units 210U. In the present embodiment, a black matrix BM has a plurality of openings O, and each of the openings O corresponds to one sub-pixel P. Each of the repeating electrode units 210U is overlapped with at least one corresponding sub-pixel P. In the present embodiment, the vertical projection of each of the repeating electrode units 210U is slightly offset from the vertical projection of the corresponding sub-pixel P. For example, each of the repeating electrode units 210U is overlapped with two adjacent sub-pixels P. However, the invention is not limited thereto. In other embodiments, each of the repeating electrode units 210U is overlapped with one sub-pixel P. In some embodiments, the ratio of width to length of the sub-pixels P is about 1 to 3, but the invention is not limited thereto. In some embodiments, the length of each of the sub-pixels P is 120 microns to 270 microns and the width thereof is 40 microns to 90 microns.

Each of the repeating electrode units 210U includes slit S. The slit S of each of the repeating electrode units 210U may include slit portions, and for example, the slit S of each of the repeating electrode units 210U includes two connected X-shapes. The slits S are formed by a slit portion S1 and slit portion S2. Slit portion S1 is a linear slit and Slit portion S2 is a bent slit connected to the linear slit. The slit portion S2 is a polyline slit or an arc slit. In the present embodiment, the two slit portions S1 are intersected to form an X shape, and the two slit portions S2 are intersected to form another X shape. In other embodiment, the slit S may be formed by a plurality of slit portions S2. In other word, the slit S may be formed by a combination of a polyline slit and an arc slit, a combination of a plurality of arc slits and an arc slit, or a combination of a plurality of polyline slits. In other embodiment, one of the slit portions of the slit of the one of the repeating electrode units in the touch electrode area includes a V shape. In other embodiment, one of the slit portions of the slit of the one of the repeating electrode units in the touch electrode area is formed by a linear slit and a bent slit connected with each other, and the bent slit is a polyline slit or an arc slit. The connecting structures CS are located in the slits S of the repeating electrode units 210U in the touch electrode area TR. In other words, the driving electrode TX and the sensing electrode RX both include the connecting structures CS, and the dummy electrode DE does not include the connecting structures CS. Therefore, the dummy electrode DE includes a plurality of island-like structures separated by the slits S. In other embodiment, the connecting structures CS are in the touch electrode area TR and not in the dummy electrode area DR such that (1) for one of the repeating electrode units 210U in the touch electrode area TR, the slit S includes a plurality of slit portions isolated with each other; and (2) for one of the repeating electrode units 210U in the dummy electrode area DR, the slit S is continuous. In some embodiments, a width W2 of the connecting structures CS is 6 microns to 25 microns, but the invention is not limited thereto.

In some embodiments, a width W1 of the slits S is 3 microns to 10 microns. The configuration of the slits S on the dummy electrode DE may provide the touch device 200 with a lower capacitive load to achieve the effect of high signal-to-noise ratio. Therefore, when used with the touch display device, the depth of the active stylus touch on the touch device 200 may be successfully sensed. With the use of active stylus, when the user writes with greater force, the touch display device may display a thicker handwriting, and when the user writes with less force, the touch control display device may display a thinner handwriting.

The dummy electrode DE and the driving electrode TX, the dummy electrode DE and the sensing electrode RX, and the driving electrode TX and the sensing electrode RX are separated by slits SS as shown in FIG. 2A. In some embodiments, the slits SS are formed by, for example, a plurality of slits S, but the invention is not limited thereto.

In the present embodiment, the electrode structure 210 is a single layer or a multilayer structure, and the material thereof includes a transparent conductive material. In the present embodiment, the dummy electrode area DR and the touch electrode area TR of the touch device 200 have similar slit configurations, and therefore have similar slit cutting rules, and the difference is only in that the touch electrode area TR has the connecting structures CS to alleviate the issue that the dummy electrode area DR and the touch electrode area TR have uneven transmittance affecting display quality. In some embodiments, the difference in transmittance of the electrode structure 210 in the dummy electrode area DR and the touch electrode area TR is about 0.22% to 0.39%, but the invention is not limited thereto.

The conductive mesh 220 includes a plurality of reticulated repeating units 220U. The reticulated repeating units 220U are located in the dummy electrode area DR and the touch electrode area TR. In other words, the dummy electrode DE, the driving electrode TX, and the sensing electrode RX all include a plurality of reticulated repeating units 220U. Each of the reticulated repeating units 220U is overlapped with at least one corresponding sub-pixel P. Each of the repeating electrode units 210U is overlapped with at least one corresponding sub-pixel P and at least one corresponding reticulated repeating unit 220U.

Each of the reticulated repeating units 220U includes a first X-shaped conductive structure X1 and a second X-shaped conductive structure X2. Two ends of the first X-shaped conductive structure X1 are connected to two ends of the second X-shaped conductive structure X2. In the present embodiment, the first X-shaped conductive structure X1 is adjacent to the linear slit portion S1, and the second X-shaped conductive structure X2 is adjacent to the bent slit portion S2. The first X-shaped conductive structure X1 and the second X-shaped conductive structure X2 are formed by, for example, at least one of a straight line, a polyline, and an arc.

The first X-shaped conductive structure X1 and the second X-shaped conductive structure X2 in the touch electrode area TR are in a continuous pattern. The first X-shaped conductive structure X1 and the second X-shaped conductive structure X2 in the dummy electrode area DR are in a discontinuous pattern. In other words, the first X-shaped conductive structure X1 and/or the second X-shaped conductive structure X2 in the dummy electrode area DR are disconnected. Therefore, the dummy electrode DE in the dummy electrode area DR is not connected to the driving electrode TX and the sensing electrode RX via the conductive mesh 220. In the present embodiment, the conductive mesh 220 is located on the repeating electrode units 210U and the connecting structures CS, and the conductive mesh 220 of the dummy electrode DE is disconnected at the slits S. As shown in FIG. 2B, for one of the reticulated repeating units 220U in the touch electrode area TR, the first X-shaped conductive structure X1 has no break and is formed into a continuous pattern, and the second X-shaped conductive structure X2 has no break and is formed into another continuous pattern. As shown in FIG. 2C, for one of the reticulated repeating units 220U in the dummy electrode area DR, the first X-shaped conductive structure X1 has four breaks and is formed into a discontinuous pattern, and the second X-shaped conductive structure X2 has four breaks and is formed into another discontinuous pattern. However, the number of the breaks of the first X-shaped conductive structure X1 and the second X-shaped conductive structure X2 can be adjusted. The invention is not limited thereto.

In the present embodiment, the conductive mesh 220 is a single layer or a multilayer structure, and the material thereof includes a metal, a metal oxide, a metal nitride, or other conductive materials. A linewidth W3 of the conductive mesh 220 is 3 microns to 12 microns.

In the present embodiment, the conductive mesh 220 in the touch electrode area TR and the conductive mesh 220 in the dummy electrode area DR have a similar shape design, and the difference is only that the conductive mesh 220 in the touch electrode area TR is in a continuous pattern and the conductive mesh 220 in the dummy electrode area DR is in a discontinuous pattern. As a result, the issue that the dummy electrode area DR and the touch electrode area TR affecting the display quality due to uneven reflectance may be alleviated. In some embodiments, the difference in reflectance of the conductive mesh 220 in the dummy electrode area DR and the touch electrode area TR is about 3.4% to 4.4%, but the invention is not limited thereto.

In the present embodiment, each of the repeating electrode units 210U is offset from at least one corresponding sub-pixel P along a first offset direction D1, and at least one corresponding reticulated repeating unit 220U is offset from at least one corresponding sub-pixel P along a second offset direction D2. In the present embodiment, the first offset direction D1 is opposite to the second offset direction D2, and therefore the conductive mesh 220 is less readily formed in the slits S, such that the conductive mesh 220 has better process margin.

Based on the above, the resistance of the touch device 200 is reduced, and the performance of the touch display device is improved. Moreover, the configuration of the slits S on the dummy electrode DE may provide the touch device 200 with a lower capacitive load to achieve high signal-to-noise ratio.

Figure 3A:
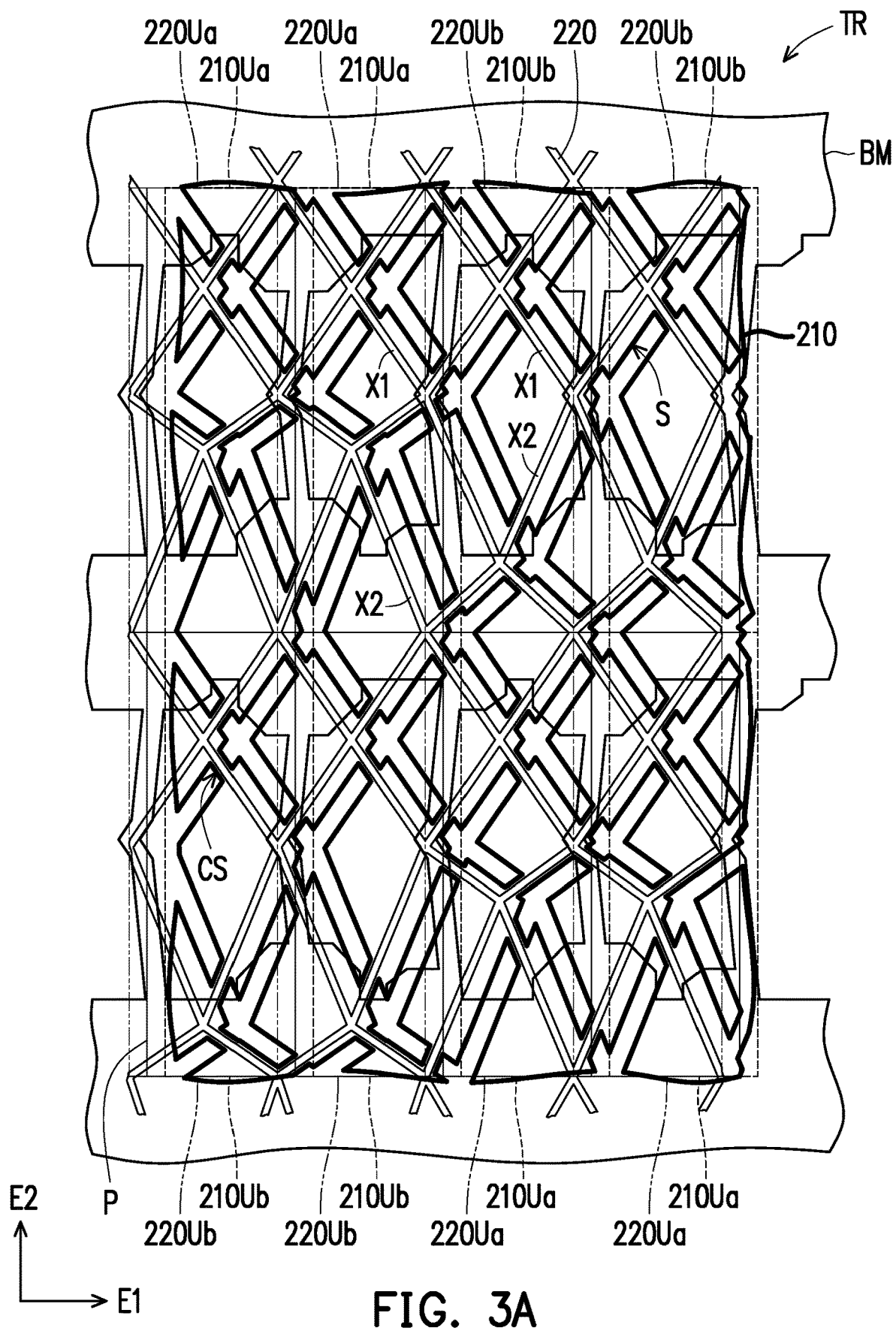
FIG. 3A is a top view of a touch electrode area of a touch display device according to an embodiment of the invention.
Figure 3B:
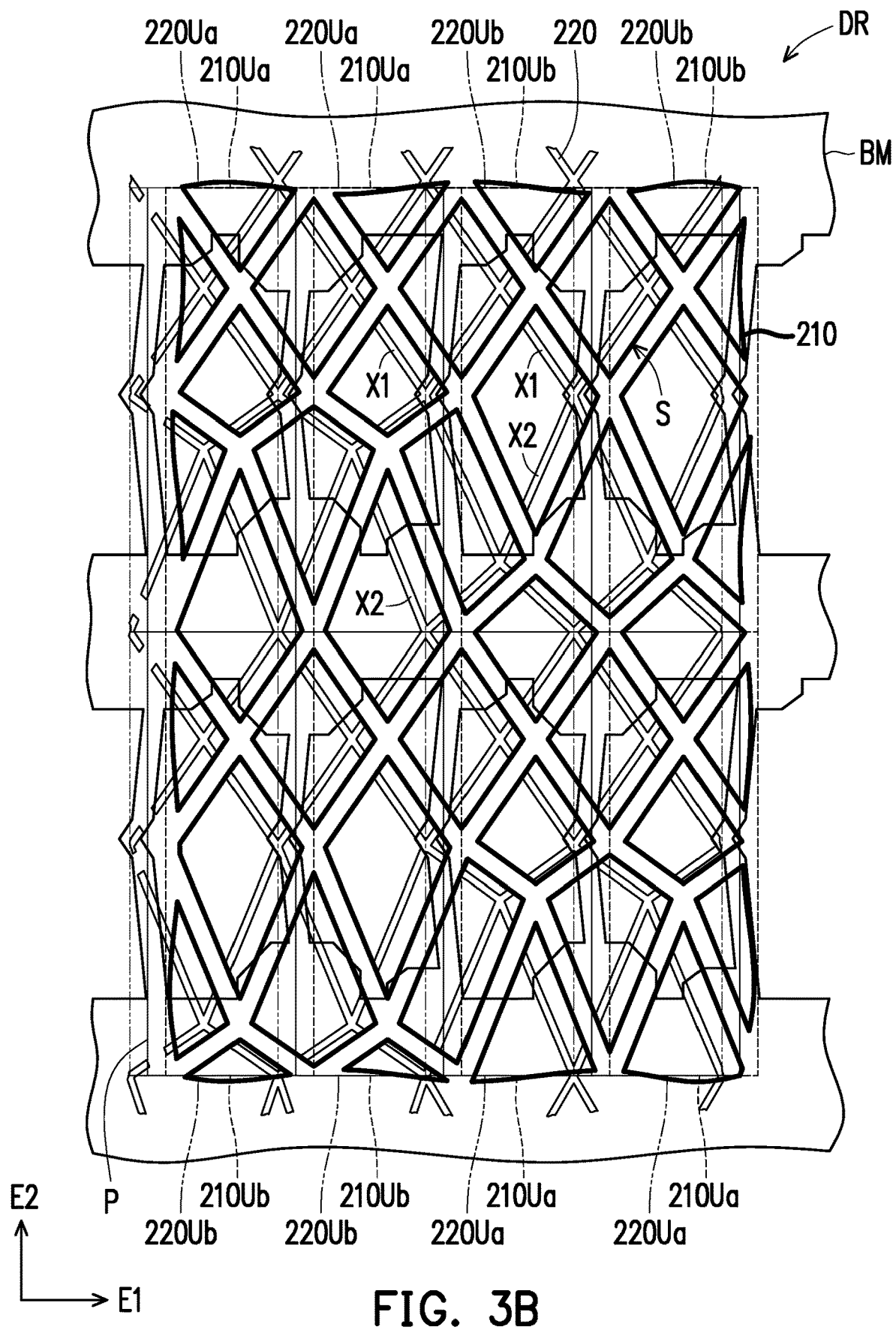
FIG. 3B is a top view of a dummy electrode area of a touch display device according to an embodiment of the invention.

FIG. 3A is a top view of a touch electrode area of a touch display device according to an embodiment of the invention. FIG. 3B is a top view of a dummy electrode area of a touch display device according to an embodiment of the invention. FIG. 3A and FIG. 3B show the electrode structure 210, the conductive mesh 220, the sub-pixels P, and the black matrix BM and omits other components. It should be mentioned here that, the embodiment of FIG. 3A and FIG. 3B adopts the reference numerals of the embodiment of FIG. 2A to FIG. 2C and a portion of the contents thereof, wherein the same or similar numerals are used to represent the same or similar devices and descriptions of the same technical contents are omitted. The omitted portions are as described in the above embodiments and are not repeated herein.

Referring to FIG. 3A and FIG. 3B, the repeating electrode units of the electrode structure 210 include first repeating electrode units 210Ua and second repeating electrode units 210Ub. There is no second repeating electrode units 210Ub located between two adjacent first repeating electrode units 210Ua. There is no first repeating electrode units 210Ua located between two adjacent second repeating electrode units 210Ub. Each of the slits S of the first repeating electrode units 210Ua and the second repeating electrode units 210Ub is two X shapes connected with each other. However, the X shape of the slits S of the first repeating electrode units 210Ua is slightly different from the X shape of the slits S of the second repeating electrode units 210Ub.

The reticulated repeating units of the conductive mesh 220 include first reticulated repeating units 220Ua and second reticulated repeating units 220Ub. There is no second reticulated repeating units 220Ub located between two adjacent first reticulated repeating units 220Ua. There is no first reticulated repeating units 220Ua located between two adjacent second reticulated repeating units 220Ub. The difference between the first reticulated repeating units 220Ua and the second reticulated repeating units 220Ub is that the shape of the second X-shaped conductive structure X2 is slightly different.

The first repeating electrode units 210Ua are overlapped with the first reticulated repeating units 220Ua, and the second repeating electrode units 210Ub are overlapped with the second reticulated repeating units 220Ub. Two adjacent first repeating electrode units 210Ua and two adjacent second repeating electrode units 210Ub are staggered along the first direction E1 and along the second direction E2, for example. Two adjacent first reticulated repeating units 220Ua and two adjacent second reticulated repeating units 220Ub are staggered along the first direction E1 and along the second direction E2, for example.

Via the configuration of the first repeating electrode units 210Ua, the second repeating electrode units 210Ub, the first reticulated repeating units 220Ua, and the second reticulated repeating units 220Ub, uneven brightness (Mura) due to the regular arrangement may be improved.

Figure 4A:
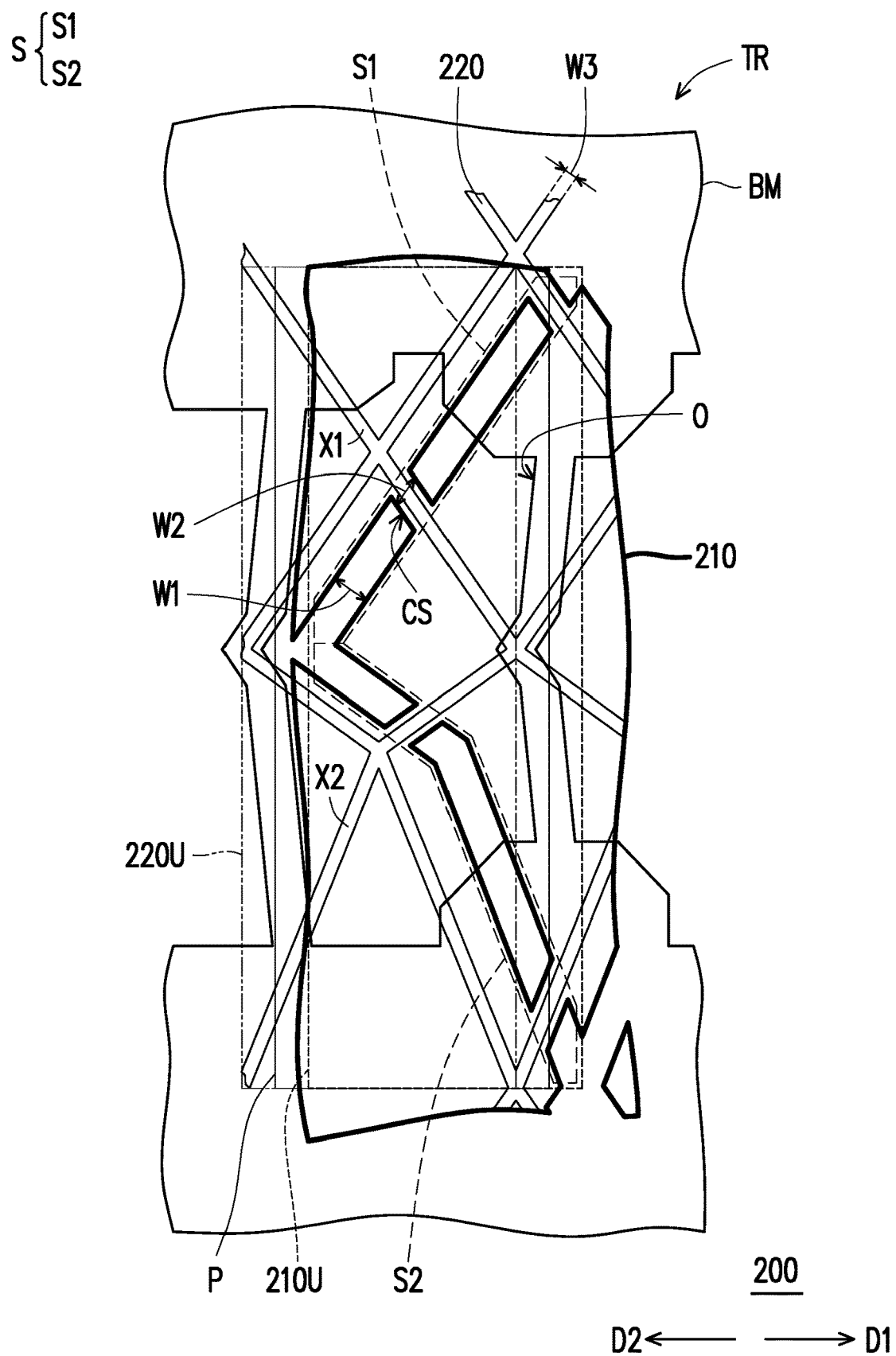
FIG. 4A is a top view of a touch electrode area of a touch display device according to an embodiment of the invention.
Figure 4B:
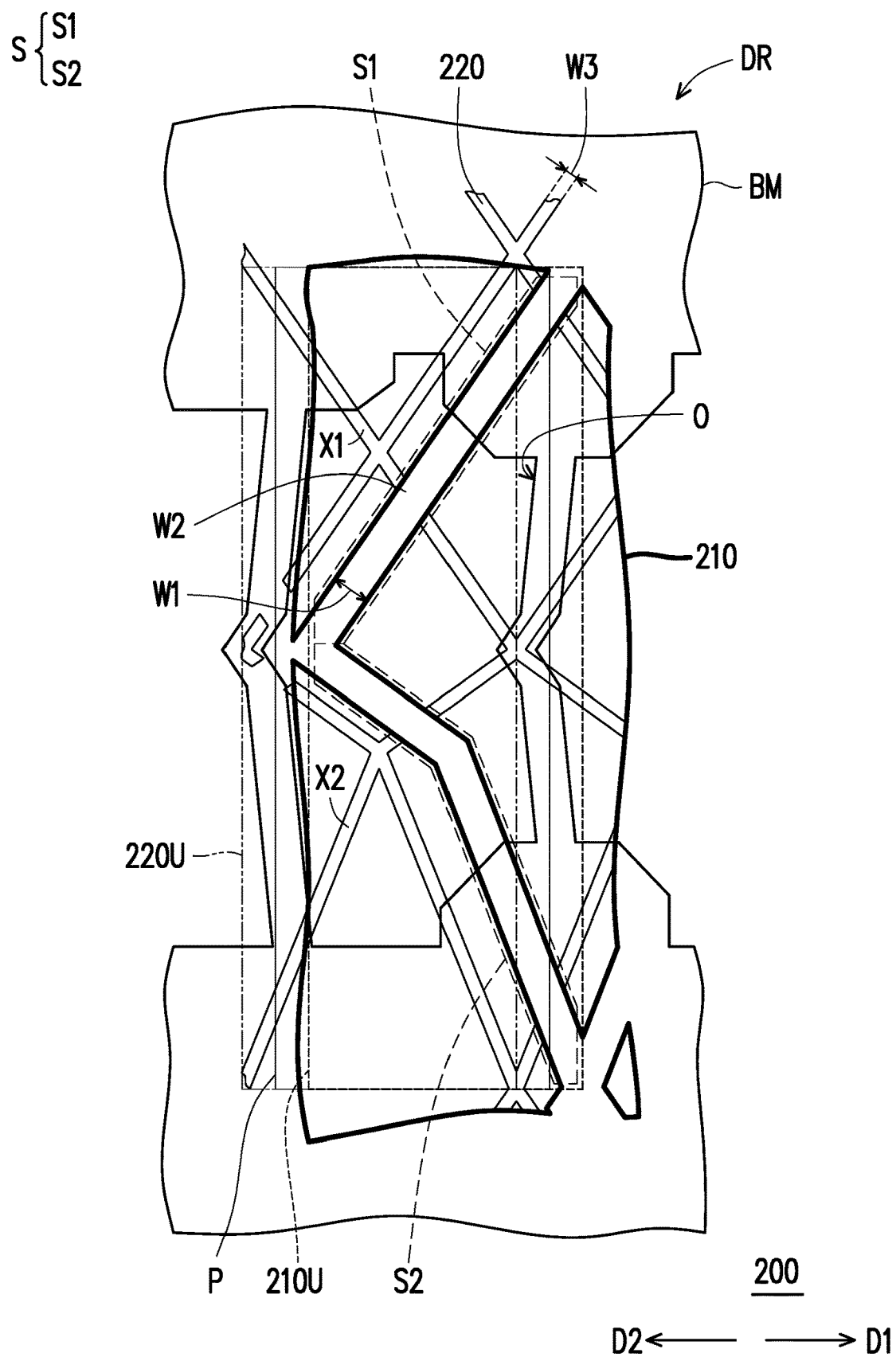
FIG. 4B is a top view of a dummy electrode area of a touch display device according to an embodiment of the invention.

FIG. 4A is a top view of a touch electrode area of a touch display device according to an embodiment of the invention. FIG. 4B is a top view of a dummy electrode area of a touch display device according to an embodiment of the invention. FIG. 4A and FIG. 4B show the electrode structure 210, the conductive mesh 220, the sub-pixels P, and the black matrix BM and omits other components. It should be mentioned here that, the embodiment of FIG. 4A and FIG. 4B adopts the reference numerals of the embodiment of FIG. 2A to FIG. 2C and a portion of the contents thereof, wherein the same or similar numerals are used to represent the same or similar devices and descriptions of the same technical contents are omitted. The omitted portions are as described in the above embodiments and are not repeated herein.

The main difference between the embodiment of FIG. 4A and FIG. 4B and the embodiment of FIG. 2A to FIG. 2C is that, in the embodiment of FIG. 4A and FIG. 4B, the slits S of each of the repeating electrode units 210U are V-shaped, and the slits S are formed by the linear slit portion S1 and the bent slit portion S2 connected to the linear slit portion S1.

Referring to FIG. 4A and FIG. 4B, the bent slit portion S2 is a polyline slit or an arc slit. The connecting structures CS are located in the slits S of the repeating electrode units 210U of the touch electrode area TR such that for one of the repeating electrode units 210U in the touch electrode area TR, the slit S includes a plurality of slit portions S1, S2, and each of the slit portions S1, S2 of the slit S in the touch electrode area TR is discontinuous.

In the present embodiment, since the slits S are V-shaped, the number of the connecting structures CS in a single repeating electrode unit 210U in the touch electrode area TR in the present embodiment is smaller compared to the embodiment of FIG. 2A to FIG. 2C. In the present embodiment, the optical difference between the touch electrode area TR and the dummy electrode area DR caused by the connecting structures CS and the conductive mesh 220 overlapped with the connecting structures CS may be further reduced. In some embodiments, the difference in transmittance of the electrode structure 210 in the dummy electrode area DR and the touch electrode area TR is less than 0.1%, but the invention is not limited thereto. In some embodiments, the difference in reflectance of the conductive mesh 220 in the dummy electrode area DR and the touch electrode area TR is less than 1%, but the invention is not limited thereto.

Figure 5A:
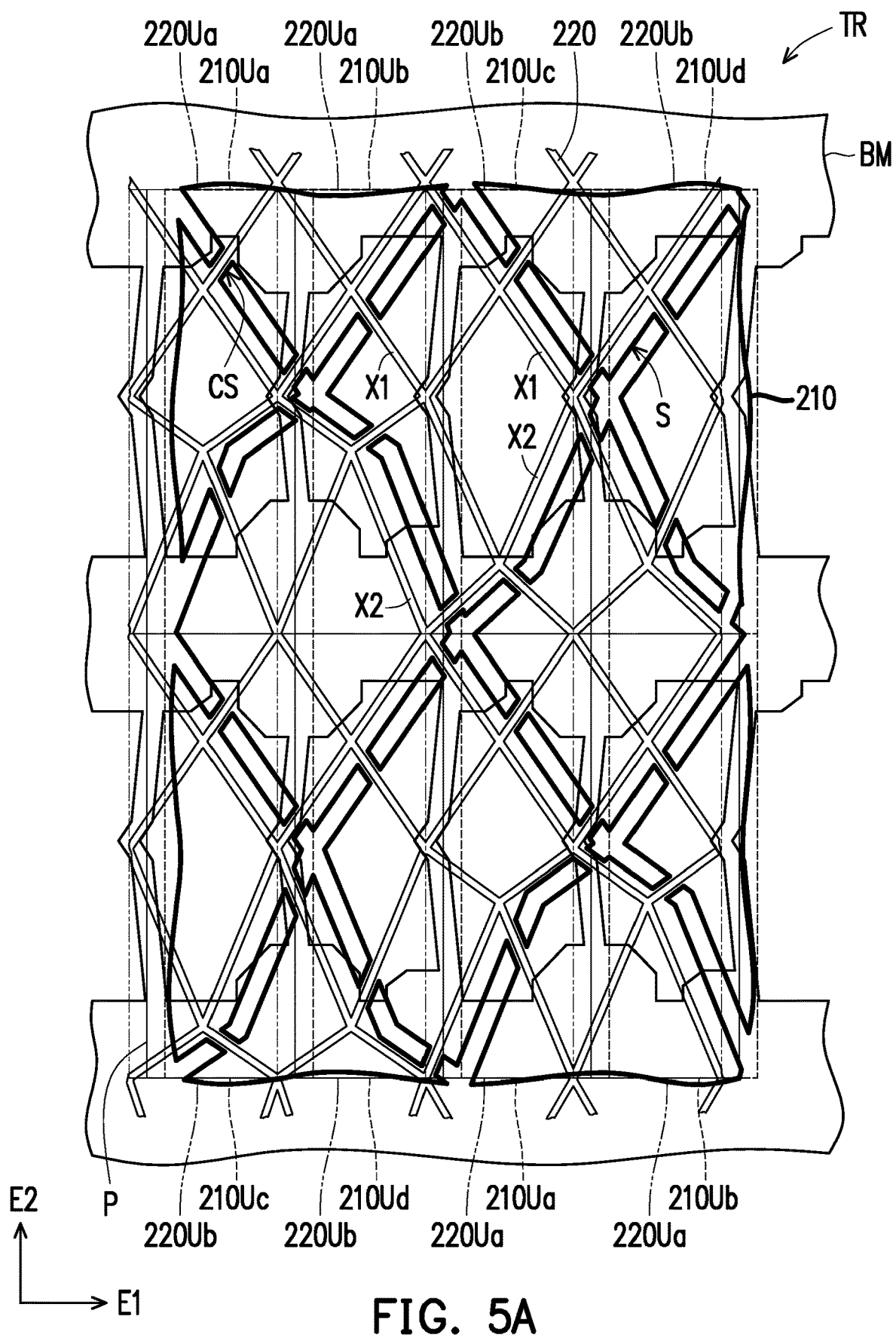
FIG. 5A is a top view of a touch electrode area of a touch display device according to an embodiment of the invention.
Figure 5B:
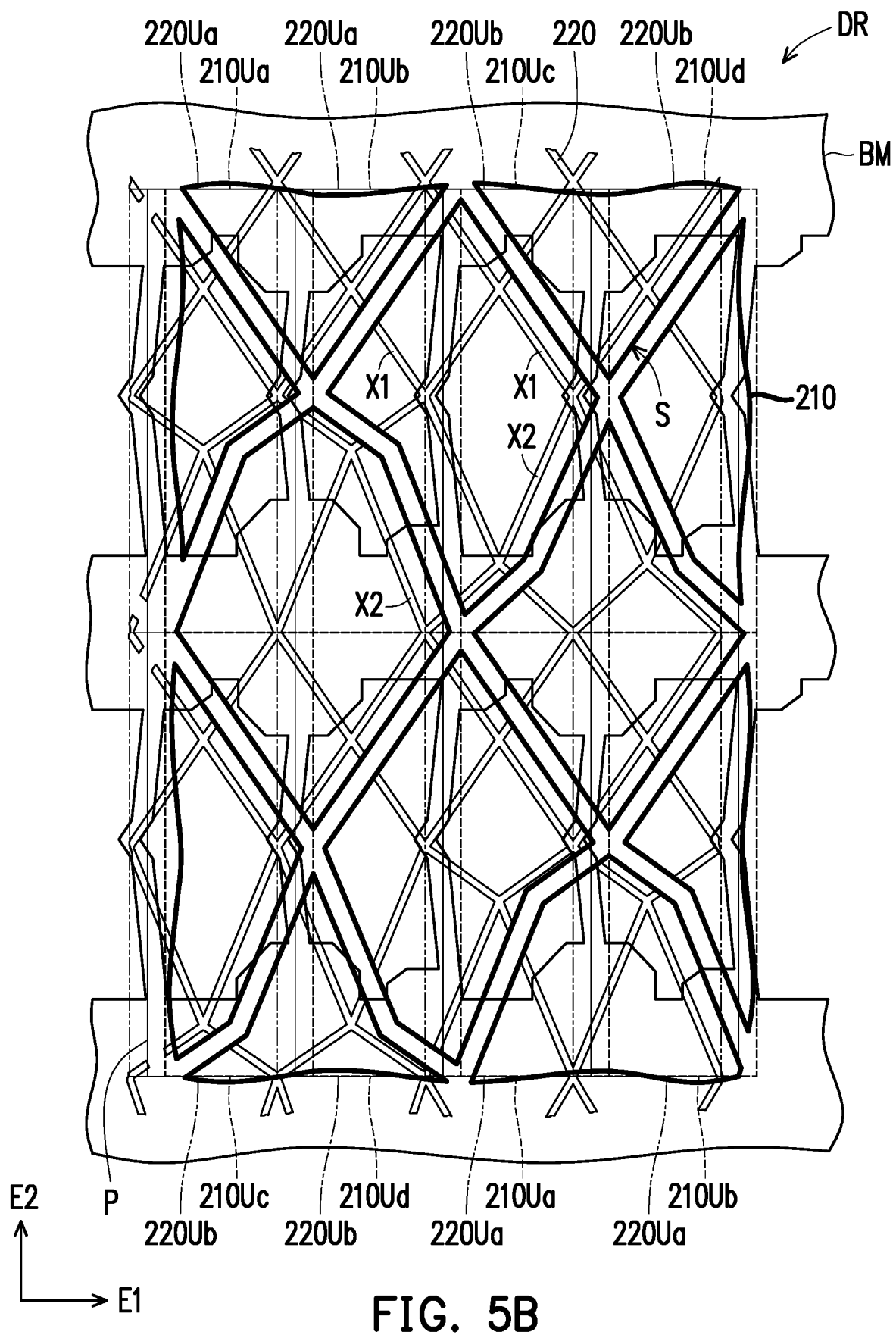
FIG. 5B is a top view of a dummy electrode area of a touch display device according to an embodiment of the invention.

FIG. 5A is a top view of a touch electrode area of a touch display device according to an embodiment of the invention. FIG. 5B is a top view of a dummy electrode area of a touch display device according to an embodiment of the invention. FIG. 5A and FIG. 5B show the electrode structure 210, the conductive mesh 220, the sub-pixels P, and the black matrix BM and omits other components. It should be mentioned here that, the embodiment of FIG. 5A and FIG. 5B adopts the reference numerals of the embodiment of FIG. 4A and FIG. 4B and a portion of the contents thereof, wherein the same or similar numerals are used to represent the same or similar devices and descriptions of the same technical contents are omitted. The omitted portions are as described in the above embodiments and are not repeated herein.

Referring to FIG. 5A and FIG. 5B, the repeating electrode units of the electrode structure 210 include the first repeating electrode units 210Ua, the second repeating electrode units 210Ub, third repeating electrode units 210Uc, and fourth repeating electrode units 210Ud. The slits S of the first repeating electrode units 210Ua, the second repeating electrode units 210Ub, the third repeating electrode units 210Uc, and the fourth repeating electrode units 210Ud are all V-shaped. However, the V shapes of the slits S of the first repeating electrode units 210Ua, the second repeating electrode units 210Ub, the third repeating electrode units 210Uc, and the fourth repeating electrode units 210Ud are slightly different.

The reticulated repeating units of the conductive mesh 220 include first reticulated repeating units 220Ua and second reticulated repeating units 220Ub. The difference between the first reticulated repeating units 220Ua and the second reticulated repeating units 220Ub is that the shape of the second X-shaped conductive structure X2 is slightly different.

Two adjacent first reticulated repeating units 220Ua are overlapped with the first repeating electrode unit 210Ua and the second repeating electrode unit 210Ub, respectively. Two adjacent second reticulated repeating units 220Ub are overlapped with the third repeating electrode unit 210Uc and the fourth repeating electrode unit 210Ud, respectively. Two adjacent first reticulated repeating units 220Ua and two adjacent second reticulated repeating units 220Ub are staggered along the first direction E1 and along the second direction E2, for example. The first repeating electrode unit 210Ua is connected to the second repeating electrode unit 210Ub. The third repeating electrode unit 210Uc is connected to the fourth repeating electrode unit 210Ud. The connected first repeating electrode unit 210Ua and second repeating electrode unit 210Ub are staggered with the connected third repeating electrode unit 210Uc and fourth repeating electrode unit 210Ud. The first repeating electrode unit 210Ua, the second repeating electrode unit 210Ub, the third repeating electrode unit 210Uc and the fourth repeating electrode unit 210Ud are arranged consecutively along the first direction E1, for example.

Via the configuration of the first repeating electrode units 210Ua, the second repeating electrode units 210Ub, the third repeating electrode units 210Uc, the fourth repeating electrode units 210Ud, the first reticulated repeating units 220Ua, and the second reticulated repeating units 220Ub, uneven brightness (Mura) due to the regular arrangement may be improved.

FIG. 6A to FIG. 9A are top views of a manufacturing method of a touch device according to an embodiment of the invention. FIG. 6B to FIG. 9B are cross-sectional views of section line aa' of FIG. 6A to FIG. 9A, respectively. For ease of explanation, the pattern of each film layer of the touch devices in FIG. 6A to FIG. 9A and FIG. 6B to FIG. 9B is only drawn in a simple geometric pattern, but each film layer of the touch device of the invention is not limited to the patterns in FIG. 6A to FIG. 9A and FIG. 6B to FIG. 9B.

Figure 6A:
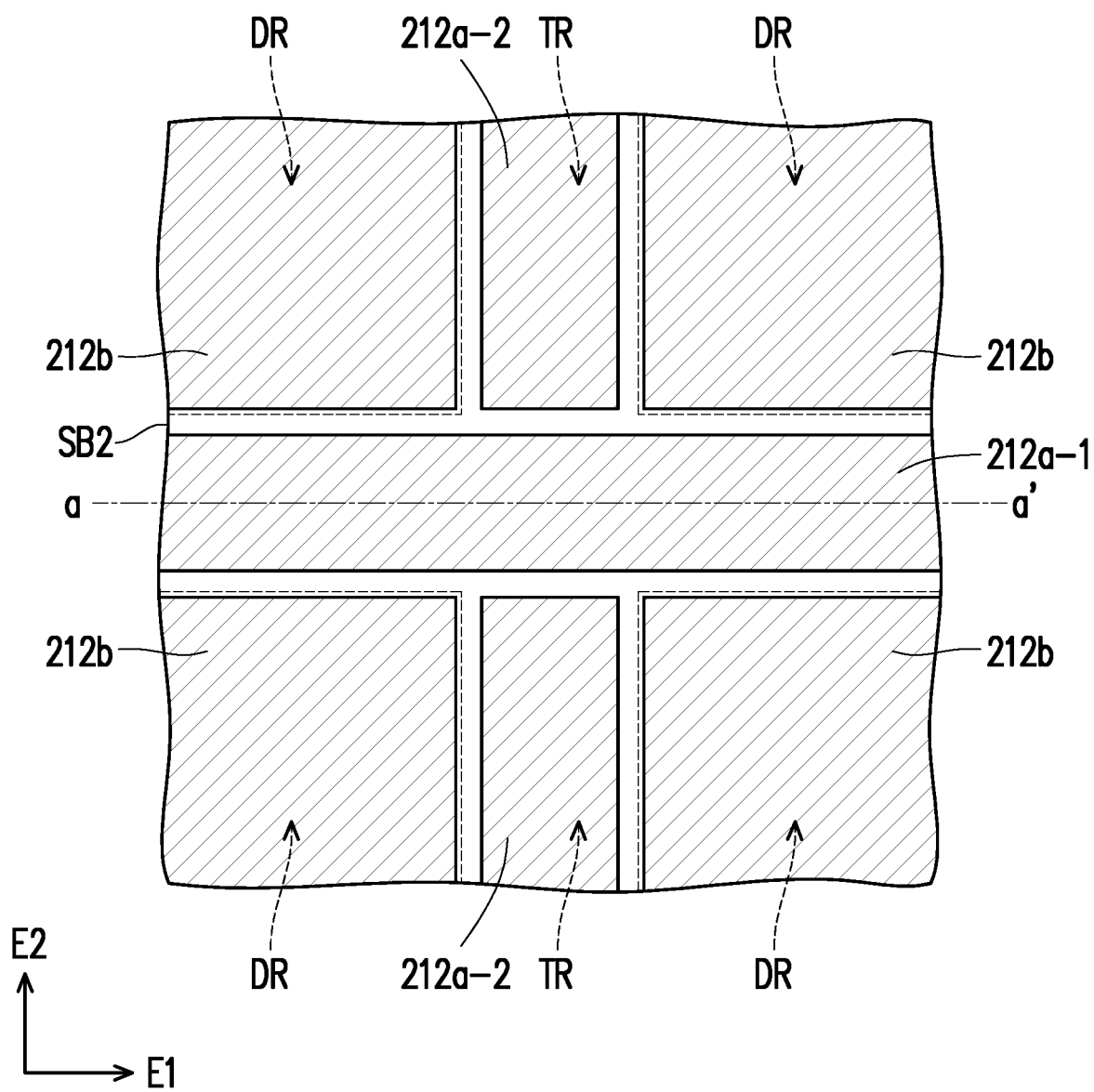
Figure 6B:
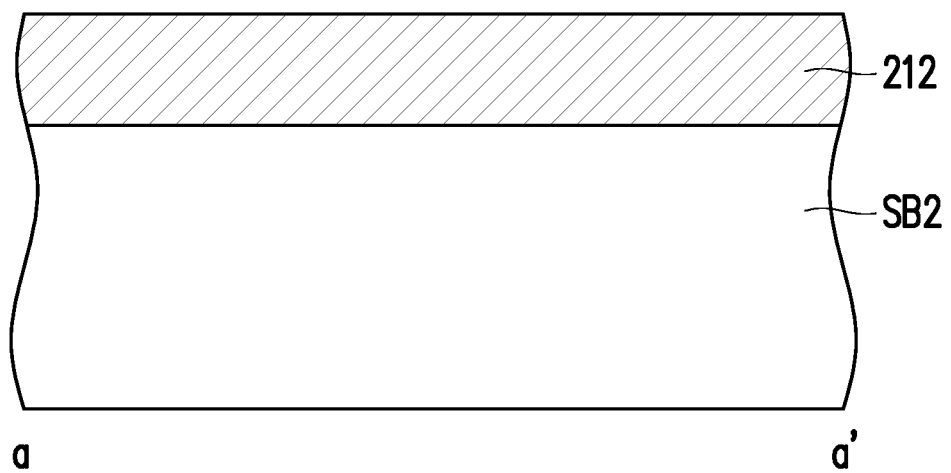

Referring to FIG. 6A and FIG. 6B, a first conductive layer 212 is formed on the second substrate SB2. The first conductive layer 212 includes a first touch electrode layer 212a located in the touch electrode area TR and a first dummy electrode layer 212b located in the dummy electrode area DR. The first touch electrode layer 212a is separated from the first dummy electrode layer 212b. The first touch electrode layer 212a includes first portions 212a-1 extended along a first direction E1 and second portions 212a-2 extended along a second direction E2. The first portions 212a-1 are separated from the second portions 212a-2. In the present embodiment, the first portions 212a-1 separate a plurality of second portions 212a-2. In the present embodiment, the material of the first conductive layer 212 is a transparent conductive oxide such as indium tin oxide, but the invention is not limited thereto.

Figure 7A:
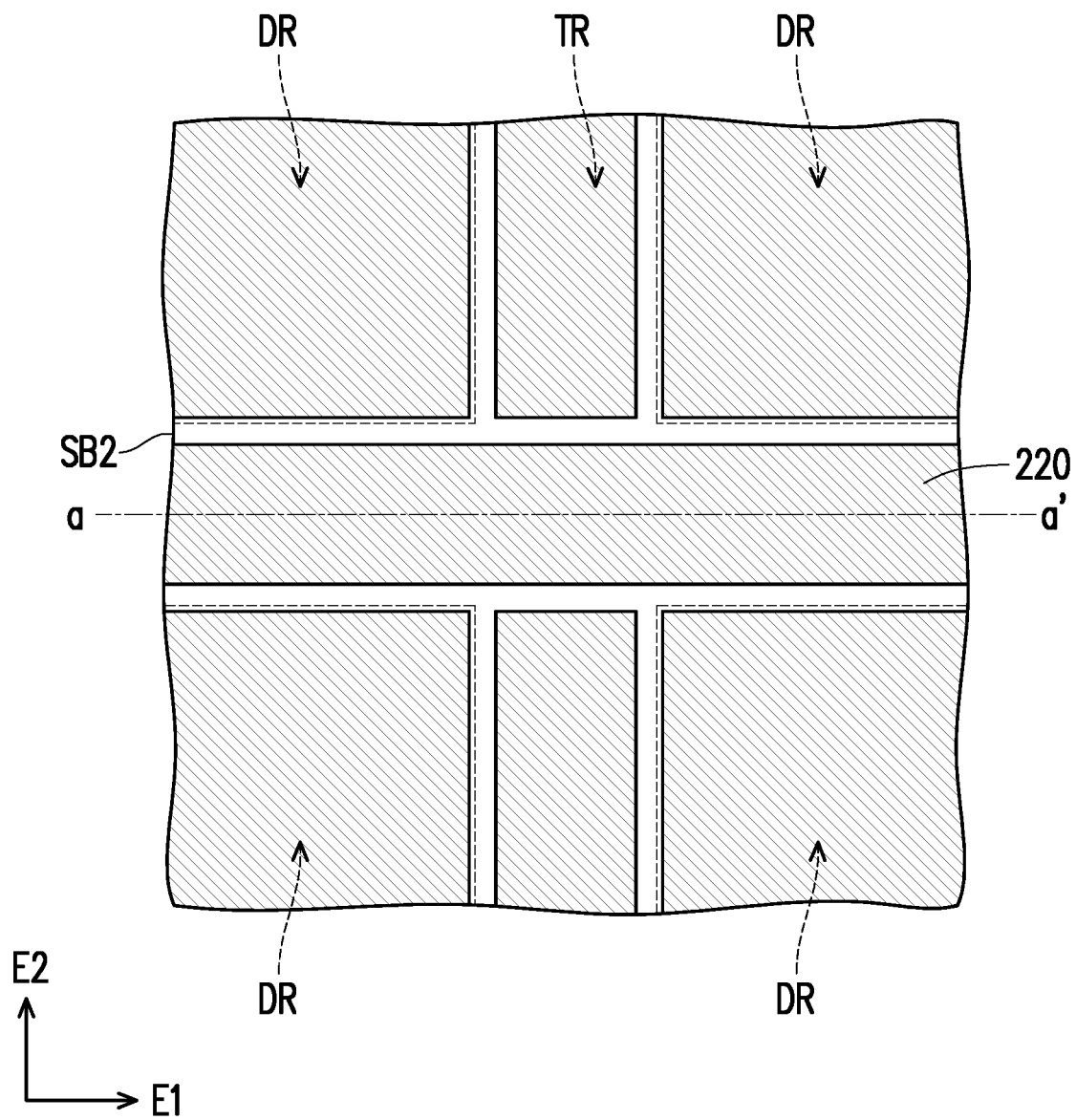
Figure 7B:
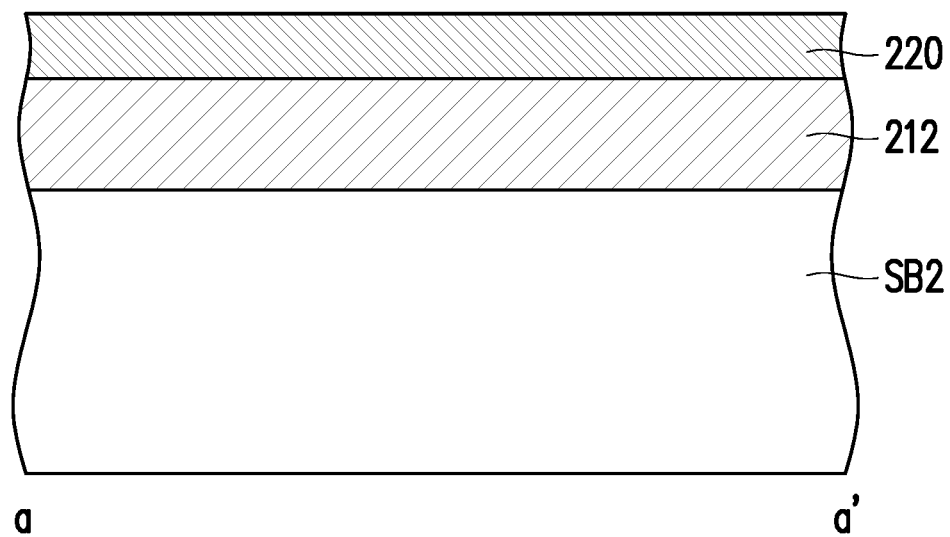

Referring to FIG. 7A and FIG. 7B, a conductive mesh 220 is formed on the first conductive layer 212. In the present embodiment, the conductive mesh 220 is formed in the touch electrode area TR and the dummy electrode area DR. In the present embodiment, the conductive mesh 220 is overlapped with the first portions 212a-1, the second portions 212a-2, and the first dummy electrode layer 212b. The conductive mesh 220 is, for example, a single layer or a multilayer structure, and the material of the conductive mesh 220 is a metal, a metal oxide, a metal nitride, or other conductive materials. For example, the conductive mesh 220 is a molybdenum nitride/aluminum/molybdenum nitride layer (MoN/Al/MoN).

Figure 8A:
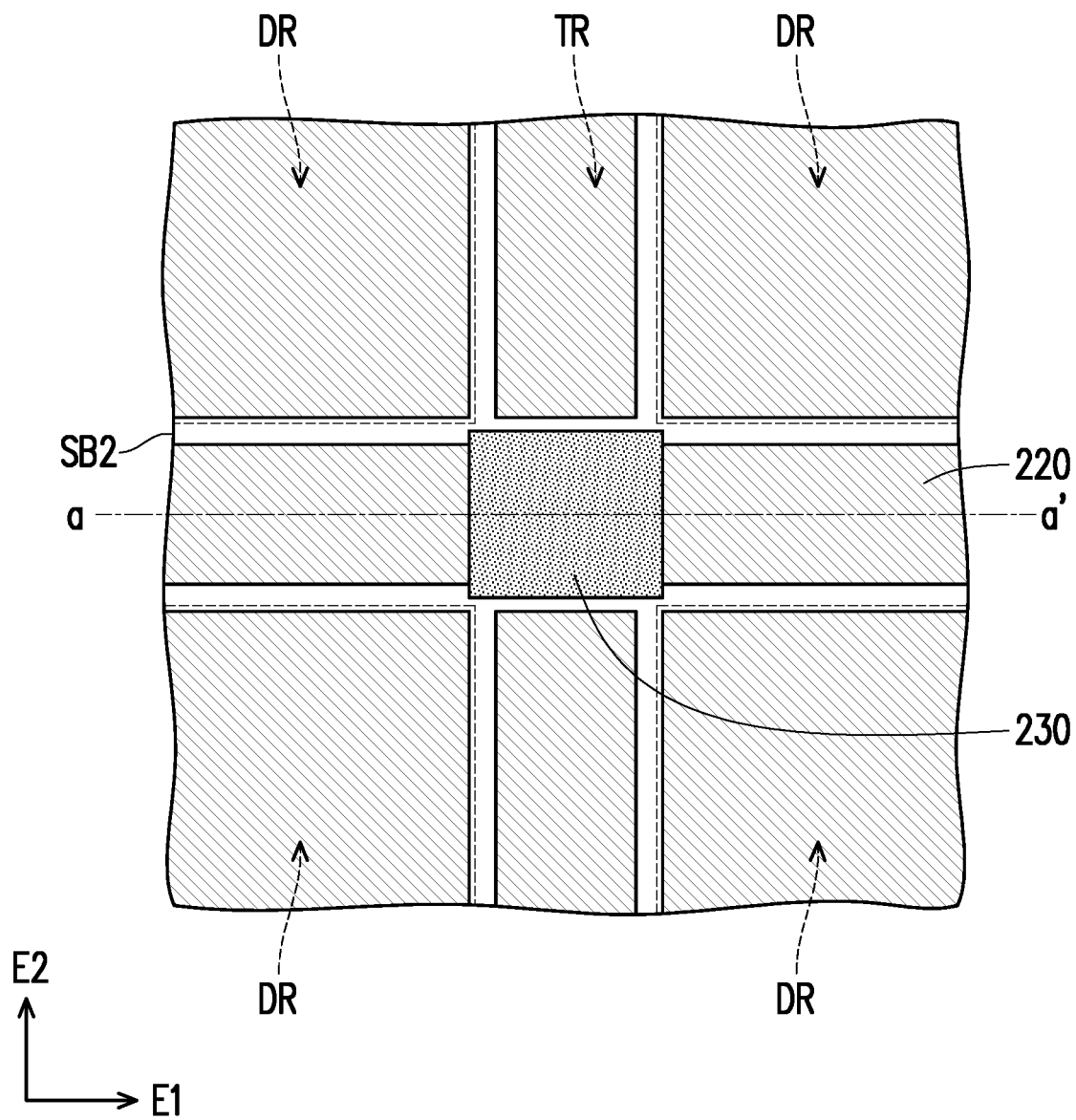
Figure 8B:
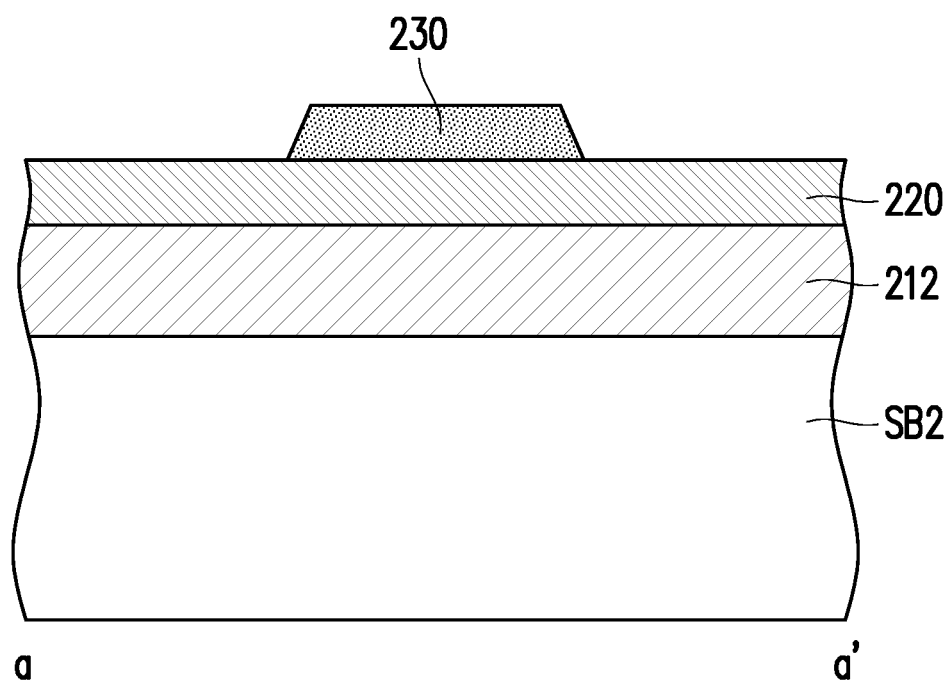

Referring to FIG. 8A and FIG. 8B, an insulating layer 230 is formed on the conductive mesh 220. In the present embodiment, the insulating layer 230 is overlapped with the first portions 212a-1 (shown in FIG. 6A) between two adjacent second portions 212a-2.

Figure 9A:
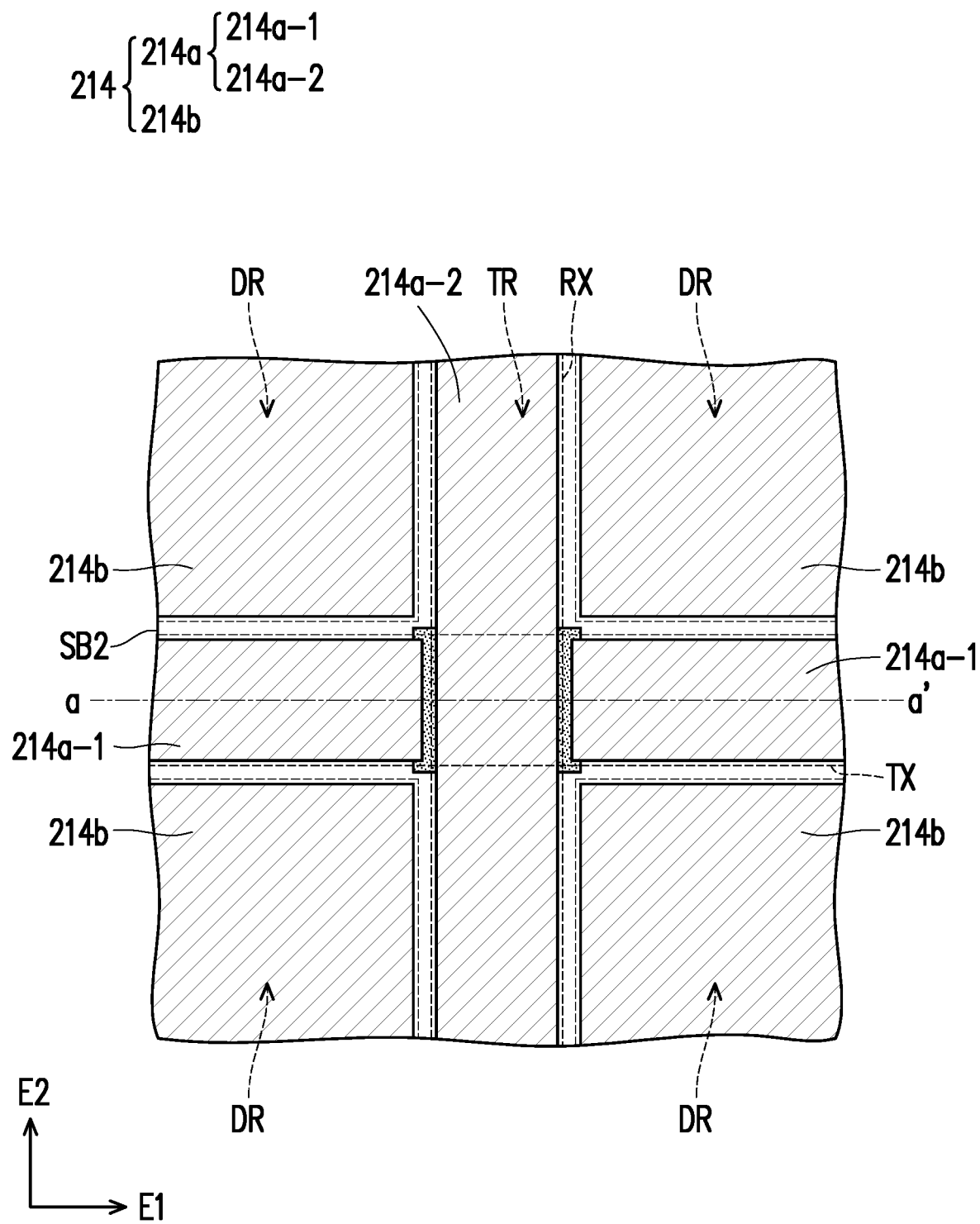
Figure 9B:
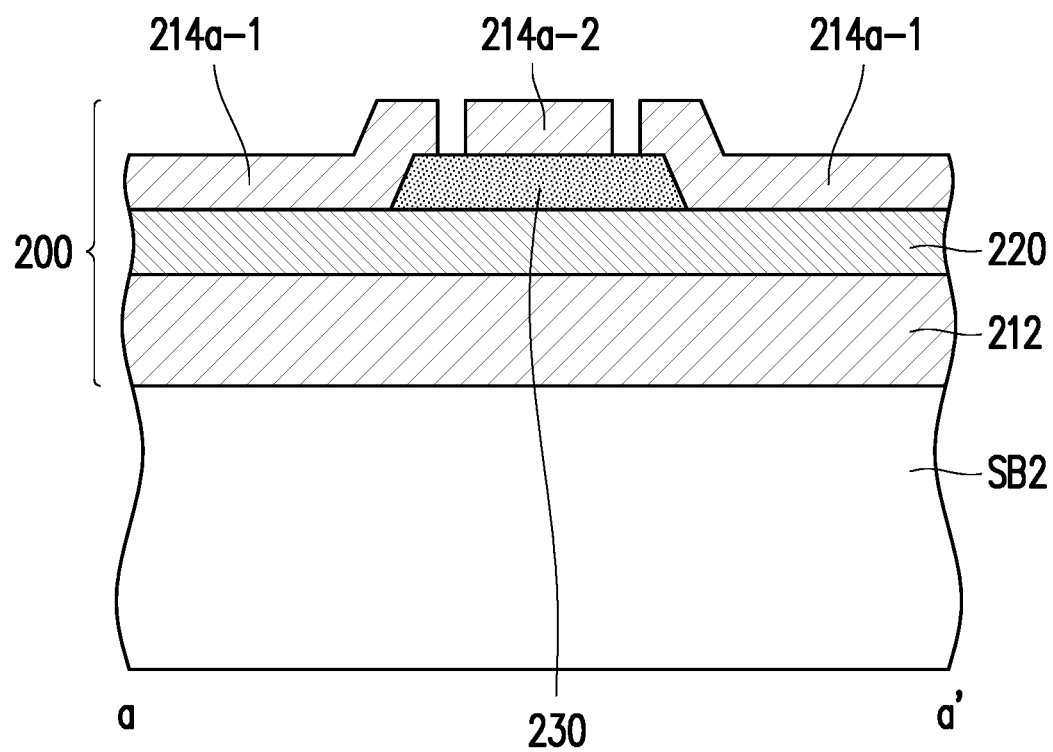

Referring to FIG. 9A and FIG. 9B, a second conductive layer 214 is formed on the insulating layer 230 and the conductive mesh 220. The electrode structure 210 includes a first conductive layer 212 and a second conductive layer 214. The conductive mesh 220 is located between and contacts the first conductive layer 212 and the second conductive layer 214.

The second conductive layer 214 includes a second touch electrode layer 214a located in the touch electrode area TR and a second dummy electrode layer 214b located in the dummy electrode area DR. The second touch electrode layer 214a is separated from the second dummy electrode layer 214b. The second touch electrode layer 214a includes first portions 214a-1 extended along the first direction E1 and second portions 214b-2 extended along the second direction E2. The first direction E1 is perpendicular to the second direction E2. The first portions 214a-1 are separated from the second portions 214a-2. In the present embodiment, the second portions 214a-2 separate a plurality of first portions 214a-1, and the plurality of separated second portions 212a-2 in the first conductive layer 212 are electrically connected to each other via the second portions 214a-2 of the second conductive layer 214. In the present embodiment, the material of the second conductive layer 214 is a transparent conductive oxide such as indium tin oxide, but the invention is not limited thereto.

In the present embodiment, the electrode structure 210 in the touch electrode area TR and the conductive mesh 220 in the touch electrode area TR form the driving electrode TX and the sensing electrode RX. The first direction E1 of the driving electrode TX is intersected with the second direction E2 of the sensing electrode RX, and the driving electrode TX is separated from the sensing electrode RX. In this embodiment, the driving electrode TX is extending along the first direction E1 and the sensing electrode RX is extending along the second direction E2. However, the invention is not limited thereto. In other embodiment, the driving electrode TX may extend along the second direction E2, and the sensing electrode RX may extend along the first direction E1.

In the present embodiment, the first portions 212a-1 of the first conductive layer 212, the first portions 214a-1 of the second conductive layer 214, and a portion of the conductive mesh 220 overlapped with the first portions 212a-1 and the first portions 214a-1 form the driving electrode TX; the second portions 212a-2 of the first conductive layer 212, the second portions 214a-2 of the second conductive layer 214, and a portion of the conductive mesh 220 overlapped with the second portions 212a-2 and the second portions 214a-2 form the sensing electrode RX.

In the present embodiment, the first dummy electrode layer 212b, the second dummy electrode layer 214b, and a portion of the conductive mesh 220 overlapped with the first dummy electrode layer 212b and the second dummy electrode layer 214b form the dummy electrode DE. In other words, dummy electrode DE is included in the dummy electrode area DR, and the dummy electrode DE is separated from the driving electrode TX and the sensing electrode RX.

At this point, the touch device 200 is substantially completed. In some embodiments, the touch device 200 optionally further includes a protective layer (not shown) covering the second conductive layer 214.

Based on the above, the resistance of the touch device 200 is reduced, and the performance of the touch display device is improved. Moreover, the configuration of the slits S on the dummy electrode DE may provide the touch device 200 with a lower capacitive load to achieve high signal-to-noise ratio.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A touch display device, comprising:
    a display panel comprising a plurality of sub-pixels, wherein each of the sub-pixels comprises a pixel electrode and a switching element electrically connected to the pixel electrode; and
    a touch device located on the display panel and having a touch electrode area and a dummy electrode area, wherein the touch device comprises an electrode structure and a conductive mesh, the conductive mesh comprises a plurality of X-shaped conductive structures distributed in the dummy electrode area, each of the X-shaped conductive structures is overlapped with at least corresponding one of the sub-pixels, wherein the electrode structure comprises:
        a plurality of repeating electrode units distributed in the dummy electrode area and the touch electrode area, wherein each of the repeating electrode units is overlapped with at least corresponding one of the sub-pixels, and each of the repeating electrode units comprises a slit; and
        a plurality of connecting structures located in the touch electrode area and not in the dummy electrode area such that:
            for one of the repeating electrode units in the touch electrode area, the slit includes a plurality of slit portions, and each of the slit portions of the slit in the touch electrode area is discontinuous; and
            for one of the repeating electrode units in the dummy electrode area, the slit is continuous.

2. The touch display device of claim 1, wherein the slit of the one of the repeating electrode units in the dummy electrode area includes two X shapes connected with each other.

3. The touch display device of claim 2, wherein one of the slit portions of the slit of the one of the repeating electrode units in the touch electrode area includes a V shape.

4. The touch display device of claim 3, wherein one of the slit portions of the slit of the one of the repeating electrode units in the touch electrode area is formed by a linear slit and a bent slit connected with each other, and the bent slit is a polyline slit or an arc slit.

5. The touch display device of claim 1, wherein a width of one of the slits is 3 microns to 10 microns.

6. The touch display device of claim 1, wherein a width of one of the connecting structures is 6 microns to 25 microns.

7. The touch display device of claim 1, wherein each of the repeating electrode units is offset from the at least corresponding one sub-pixel along a first offset direction.

8. The touch display device of claim 1, wherein a material of the conductive mesh comprises a metal, a metal oxide, or a metal nitride.

9. The touch display device of claim 1, wherein a material of the electrode structure comprises a transparent conductive material.

10. The touch display device of claim 1, wherein a ratio of width to length of each of the sub-pixels is 1:3.

11. The touch display device of claim 1, wherein a length of each of the sub-pixels is 120 microns to 270 microns and a width thereof is 40 microns to 90 microns.

12. The touch display device of claim 1, wherein the electrode structure comprises a first conductive layer and a second conductive layer, and the conductive mesh is located between the first conductive layer and the second conductive layer.

13. The touch display device of claim 1, wherein a linewidth of the conductive mesh is 3 microns to 12 microns.

14. A touch display device, comprising:
    a display panel comprising a plurality of sub-pixels, wherein each of the sub-pixels comprises a pixel electrode and a switching element electrically connected to the pixel electrode; and
    a touch device located on the display panel and having a touch electrode area and a dummy electrode area, wherein the touch device comprises an electrode structure and a conductive mesh, the conductive mesh comprises a plurality of X-shaped conductive structures distributed in the dummy electrode area, each of the X-shaped conductive structures is overlapped with at least corresponding one of the sub-pixels, wherein the electrode structure comprises a first conductive layer and a second conductive layer, and the conductive mesh is located between the first conductive layer and the second conductive layer,
    wherein the second conductive layer comprises a second touch electrode layer in the touch electrode area, the second touch electrode layer comprises a plurality of first portions extending along a first direction and a plurality of second portions extending along a second direction perpendicular to the first direction, and the first portions are separated from the second portions.

15. The touch display device of claim 14, wherein the second conductive layer further comprises a second dummy electrode layer located in the dummy electrode area, and the second touch electrode layer is separated from the second dummy electrode layer.

16. The touch display device of claim 14, wherein the electrode structure comprises:
    a plurality of repeating electrode units distributed in the dummy electrode area and the touch electrode area, wherein each of the repeating electrode units is overlapped with at least corresponding one of the sub-pixels, and each of the repeating electrode units comprises a slit; and a plurality of connecting structures located in the touch electrode area and not in the dummy electrode area, and the slit in one of the repeating electrode units in the touch electrode area includes a plurality of slit portions, wherein the slit of one of the repeating electrode units in the dummy electrode area includes two X shapes connected with each other.

17. The touch display device of claim 16, wherein one of the slit portions of the slit of the one of the repeating electrode units in the touch electrode area includes a V shape.

18. The touch display device of claim 17, wherein one of the slit portions of the slit of the one of the repeating electrode units in the touch electrode area is formed by a linear slit and a bent slit connected with each other, and the bent slit is a polyline slit or an arc slit.

19. The touch display device of claim 14, wherein the electrode structure comprises:
a plurality of repeating electrode units distributed in the dummy electrode area and the touch electrode area, wherein each of the repeating electrode units is overlapped with at least corresponding one of the sub-pixels, and each of the repeating electrode units comprises a slit, wherein a width of the slit is 3 microns to 10 microns.

20. The touch display device of claim 14, wherein the electrode structure comprises:
a plurality of repeating electrode units distributed in the dummy electrode area and the touch electrode area, wherein each of the repeating electrode units is overlapped with at least corresponding one of the sub-pixels, and each of the repeating electrode units comprises a slit; and
a plurality of connecting structures located in the touch electrode area and not in the dummy electrode area, wherein a width of one of the connecting structures is 6 microns to 25 microns.

21. A touch display device, comprising:
a display panel comprising a plurality of sub-pixels, wherein each of the sub-pixels comprises a pixel electrode and a switching element electrically connected to the pixel electrode; and a touch device located on the display panel and having a touch electrode area and a dummy electrode area, wherein the touch device comprises an electrode structure and a conductive mesh, the conductive mesh comprises a plurality of X-shaped conductive structures distributed in the dummy electrode area and a plurality of patterns distributed in the touch electrode area, wherein a portion of one of the patterns distributed in the touch electrode area comprises a V shape, and wherein the electrode structure comprises:
a plurality of repeating electrode units distributed in the dummy electrode area and the touch electrode area, wherein each of the repeating electrode units is overlapped with at least corresponding one of the sub-pixels, and each of the repeating electrode units comprises a slit; and
a plurality of connecting structures located in the touch electrode area and not in the dummy electrode area such that:
for one of the repeating electrode units in the touch electrode area, the slit includes a plurality of slit portions, and each of the slit portions of the slit in the touch electrode area is discontinuous.

22. The touch display device of claim 21, wherein the slit of one of the repeating electrode units in the dummy electrode area includes two X shapes connected with each other.

23. The touch display device of claim 22, wherein one of the slit portions of the slit of the one of the repeating electrode units in the touch electrode area includes a V shape.

24. The touch display device of claim 23, wherein one of the slit portions of the slit of the one of the repeating electrode units in the touch electrode area is formed by a linear slit and a bent slit connected with each other, and the bent slit is a polyline slit or an arc slit.

25. The touch display device of claim 21, wherein a width of one of the connecting structures is 6 microns to 25 microns.

* * * * *